United States Patent Office 3,087,778
Patented Apr. 30, 1963

3,087,778
CORROSION INHIBITING
John S. Negra, South Plainfield, N.J., and Jack W. McCloskey, Harrison, N.Y., assignors to Chemical Construction Corporation, New York, N.Y., a corporation of Delaware
No Drawing. Filed Feb. 17, 1961, Ser. No. 89,904
3 Claims. (Cl. 23—3)

This invention relates to the inhibiting or prevention of metallic corrosion which may occur in chemical processes employing hot aqueous potassium carbonate solution to remove weakly acidic gases from gas streams. The invention is particularly directed to processes such as the manufacture of synthesis gas by the partial oxidation of sulfur-containing crude oil, in which the crude synthesis gas is scrubbed with carbonate solution to remove carbon dioxide together with a minor but highly significant proportion of hydrogen sulfide. The presence of hydrogen sulfide highly aggravates the corrosion problem which normally exists.

The removal of weakly acidic gases from process gas streams by the use of hot potassium carbonate solution as an aqueous absorbent solution has assumed increasing importance in recent years. Operating details of a typical process of this nature are described in U.S. Patent No. 2,886,405. The process generally consists of a gas scrubbing step at elevated pressure, during which the aqueous carbonate solution absorbs the weakly acidic gas or gases from the gas stream, followed by a separate regeneration step at lower pressure whereby the weakly acidic gas is removed from the liquid solution. The regenerated solution is then recycled to the gas scrubbing step. Typical acidic gases which are removed from process gas streams in this manner include carbon dioxide, hydrogen sulfide, hydrogen cyanide and carbonyl sulfide.

The process is generally carried out in carbon steel vessels, with stainless steel being employed at critical points. Corrosion of process equipment has always been a significant operating problem in this process. It has heretofore been alleviated or prevented by the addition of various compounds or agents to the circulating carbonate solution. Among these may be mentioned chromates, silicates, and organic agents such as film-forming, highly polar aliphatic polyamines having two or more amino groups located at the end of long hydrocarbon chain. In some instances the gas stream itself may contain sufficient amounts of certain compounds which act as corrosion inhibitors. Thus, in numerous instances, the presence of a large proportion of hydrogen sulfide in the crude gas stream acts to reduce or prevent corrosion. However, in recent years the gasification of high-sulfur crude oil or residual oil to produce synthesis gas has caused new and serious corrosion problems, since the crude gas stream which is produced from such starting materials contains a proportion of hydrogen sulfide which is great enough to cause serious corrosion, while not being sufficient to act as an inhibitor of corrosion. The presence of this large proportion of hydrogen sulfide precludes the use of chromate as a corrosion inhibitor, because major precipitation of chromium sulfide readily occurs. Organic agents such as the amines mentioned supra are likewise unable to prevent corrosion under these conditions. All known inhibitors for hot potassium carbonate systems have been tested and found to be deficient or ineffective under these circumstances. Addition of the extra hydrogen sulfide or other sulfur compound to the gas stream or elsewhere in the system, so as to raise the hydrogen sulfide level of the system to the corrosion-inhibiting range is objectionable because of erratic results. It has been found that the protective coating formed at times has a tendency to flake off thus exposing the surface of the metal to corrosive effects of the solution. Furthermore, the hydrogen sulfide content does not remain constant throughout the solution, thereby causing a deficiency of protective hydrogen sulfide at various times and places.

It has now been found that the soluble compounds of arsenic, antimony, bismuth and phosphorus are effective corrosion inhibitors for the hot carbonate gas scrubbing process. The trivalent metallic compounds of these elements, such as oxides, phosphite or hypophosphite are particularly effective inhibitors. Thus, small amounts of the oxides of arsenic, antimony or bismuth serve to substantially prevent corrosion even in the most extreme instances as outlined supra, where hydrogen sulfide is present to a minor but aggressively corrosive extent. These inhibitors are highly advantageous, since the life of existing plant equipment is increased and major corrosion prevented while processing gas streams with various concentrations of corrosive weakly acidic gases such as hydrogen sulfide. Additionally, considerable economic savings in new plants may now be achieved since use of these inhibitors permits the substitution of mild steel in various types of equipment and at various points where stainless steel has heretofore been employed. It has been found that these inhibitors control corrosion in the vapor or gas phase as well as in the liquid phase. These inhibitors are relatively inexpensive and only small quantities are required for complete protection. Thus, usage of these inhibitors does not increase the operating costs of the hot carbonate process to any significant extent. Other advantages include stability under process operating conditions with very low process loss, no significant accumulation of residue or decomposition products, and no tendency to foul the metal surfaces.

It should be noted that certain of these compounds, such as arsenious oxide, have been utilized in the prior art in conjunction with hot and usually dilute carbonate solution as combined absorbents for weakly acidic gases, particularly for carbon dioxide. It has been known for some time that an aqueous scrubbing solution in which hot carbonate and arsenious oxide are both present in substantial proportions is an effective absorption solution for this purpose, and is highly advantageous under certain circumstances. However, this process of the prior art completely failed to comprehend that the addition of small amounts of arsenious oxide to hot carbonate solution; such as a potassium carbonate solution which contains at least 15% potassium carbonate, would serve to inhibit corrosion, especially corrosion which is aggravated due to the presence of hydrogen sulfide. It is well recognized in the art that the strength of the potassium carbonate solution should be maintained within the above range to effectively scrub out the carbon dioxide content of a gas. Generally, the hot potassium carbonate solution is maintained at a temperature of 220°–240° F., but temperatures of 175° to 275° F. are also contemplated as being within the scope of this invention. In the present invention, the addition of arsenious oxide does not modify the absorptive capacity of the solution to any significant extent, however, this addition does produce a marked and major decrease in corrosiveness of the solution during gas scrubbing.

It is an object of the present invention to inhibit corrosion in the process of removing weakly acidic gases from gas streams by scrubbing with hot potassium carbonate solution.

Another object is to inhibit corrosion in this process, when the gas stream contains hydrogen sulfide.

A further object is to inhibit corrosion in this process, when the gas stream contains hydrogen sulfide in an amount insufficient to act as a self-inhibiting agent.

An additional object is to provide a corrosion inhibitor for this process, which permits the substitution of mild steel apparatus where stainless steel has previously been employed.

Still another object is to control vapor and gas phase corrosion in this process, as well as liquid phase corrosion.

Still a further object is to provide an inhibitor which is effective in relatively small and inexpensive amounts, in controlling corrosion in this process when the gas stream contains a minor but corrosive proportion of hydrogen sulfide.

These and other objects and advantages of the present invention will become evident from the corrosion test data and discussion which follows.

Four groups of corrosion tests were carried out, under test conditions simulating actual process conditions. In these tests, three metal samples were employed to provide surface for corrosion attack. One sample was a mild steel disc, which was attached to an agitator shaft and rotated in the corrosive solution. The other two samples were metal tubes, of mild steel and type 304 stainless steel respectively. The outer surface of these tubes was exposed to the corrosive solution, while 80 p.s.i.g. steam was passed inside the tubes. The tubes thus provided steam heating to the solution during the test, and kept the solution at boiling temperature. In the following data tables, these three samples are designated as Mild St. Disc, Mild St. Tube and S.S. Tube, respectively. The corrosion rate in each test was determined by measuring the sample weight before and after the test. The loss in weight, divided by the area of exposed surface, provided a measure of the corrosion rate which, by the use of an appropriate factor, was calculated into equivalent inches per year (i.p.y.) of corrosion penetration. The i.p.y. value is a standard measure of relative corrosion resistance. In applications involving chemical apparatus such as employed in hot carbonate systems, an i.p.y. of 0.02 or lower is usually considered acceptable. However, this is a highly empirical standard, and it should be understood that, in practice, numerous other factors such as economic considerations are highly significant.

The test corrosive solution consisted of an aqueous solution containing 35% equivalent of dissolved potassium carbonate. Under test conditions, as in actual practice, part of the carbonate is converted to bicarbonate by reaction with dissolved carbon dioxide. A gas of controlled composition was passed through the solution during the test period. Usually the test gas contained 0.08% hydrogen sulfide, 71% hydrogen, 25% carbon dioxide and 3% carbon monoxide. This gas composition is similar to that which is encountered on gasification of high-sulfur crude oil by partial oxidation, as described supra. In addition, other gas streams of various compositions were employed in some of the tests for comparison purposes, as in Table I infra. Finally, in one group of tests reported in Table IV infra, a cyclic test sequence was employed. This test procedure was used initially for screening inhibitors. It is a more drastic test than continuous feeding of a gas stream containing a small fixed proportion of hydrogen sulfide, since the sulfide concentration in solution varies to the extremes of the highly corrosive range. The procedure consisted of 5 hours' gassing with carbon dioxide only, ½ hour gassing with a stream containing 71% hydrogen, 25% carbon dioxide, 3% carbon monoxide and 1% hydrogen sulfide and ½ hour boiling without gassing. The cycle is then repeated, starting with carbon dioxide gassing, with the several phases alternating throughout the test period.

The various inhibitors were dissolved in separate portions of the carbonate solution, to produce inhibitor concentrations in solution as specified infra in the tables. These concentrations are expressed as weight percent, except for a few cases where concentrations were of a small order of magnitude and consequently were expressed in parts per million (p.p.m.). In some instances the final concentration of inhibitor after the test period was measured; however, in many cases this value was not determined. Where a variable was not measured in a particular test, the omission was designated by (x). Where a variable was zero or negligible in a particular test, this was indicated by a dash (—). In numerous instances infra, a test corrosion rate will be indicated as —. This does not necessarily mean that significant corrosion was absent, since a coating buildup took place in some of these cases. Such coatings are considered to be of negligible value in practical corrosion resistance.

The test results as presented infra in the tables will not be analyzed in detail, since the absolute and relative effectiveness of the oxides of arsenic, antimony and bismuth, as well as the hypophosphites, is readily evident. Arsenious oxide ($As_2O_3$) was extensively tested under a variety of conditions, and the test results clearly show that it is highly effective, particularly in the range of 0.1% to 0.5% concentration in solution. The known inhibitors which were tested all proved to be relatively unsatisfactory. Many compounds simply did not effectively inhibit corrosion, in some instances they reacted with the hydrogen sulfide, and in other cases such as with potassium silicate the inhibitor hydrolyzed in the carbonate-bicarbonate solution. In the following presentation of test results, brief comments and discussion of data relative to each table will be found immediately after the respective table.

*Table I.—No Inhibitor*

| Test No. | Feed gas composition, volume percent | | | | Percent $H_2S$ in solution | Corrosion rate, i.p.y. | | |
|---|---|---|---|---|---|---|---|---|
| | $H_2S$ | $H_2$ | $CO_2$ | CO | | Mild St. Disc | Mild St. Tube | S.S. Tube |
| 1 | — | — | 100 | — | — | 0.450 | 1.20 | 0.024 |
| 2 | 0.08 | 71 | 25 | 3 | 0.013 | 0.150 | — | — |
| 3 | 1.0 | 71 | 25 | 3 | 0.009 | 0.240 | 0.270 | 0.001 |
| 4 | 1.0 | 71 | 25 | 3 | 0.040 | 0.130 | 0.005 | 0.005 |
| 5 | 50.0 | — | 50.0 | — | 0.250 | 0.002 | 0.014 | 0.031 |
| 6 | 50.0 | — | 50.0 | — | 1.720 | 0.001 | 0.015 | 0.033 |

Note.—Duration of tests (test time) in Test Nos. 1-6 was 98 hours.

Table I shows that a 100% carbon dioxide feed gas is highly corrosive in the absence of an inhibitor. The presence of a small proportion of hydrogen sulfide in the feed gas also results in relatively high corrosion rates when no inhibitor is present. With high content of hydrogen sulfide in the feed gas, corrosion is apparently inhibited due to the presence of a significant proportion of hydrogen sulfide in the solution. However, this is an erratic phenomenon and the protective scale that is formed cannot be depended upon to adhere permanently to metallic surfaces in practice. Subsequent localized loss of the scale can result in severe corrosion due to concentrated attack at these points. The data also shows that a minimum sulfide concentration must be maintained for inhibition. In practice, this cannot be guaranteed throughout the system while still maintaining good removal of hydrogen sulfide from the gas stream.

Table II.—*Arsenious Oxide Inhibitor*

| Test No. | Test time, hrs. | Inhibitor in solution—conc., weight percent | | Corrosion rate, i.p.y. | | |
|---|---|---|---|---|---|---|
| | | Initial | Final | Mild St. Disc | Mild St. Tube | S.S. Tube |
| 7 | 84 | 0.90 | 0.75 | — | 0.084 | 0.001 |
| 8 | 98 | 1.0 | 0.90 | 0.001 | 0.017 | 0.014 |
| 9 | 57 | 0.056 | 0.025 | 0.091 | 1.72 | 0.010 |
| 10 | 90 | 0.10 | x | — | 0.023 | 0.002 |
| 11 | 57 | 0.20 | 0.15 | 0.014 | 0.380 | 0.022 |
| 12 | 90 | 0.20 | x | — | 0.022 | 0.002 |
| 13 | 84 | 0.43 | 0.36 | — | 0.033 | 0.001 |
| 14 | 84 | 0.50 | x | — | 0.019 | 0.001 |
| 15 | 98 | 0.50 | 0.43 | — | 0.012 | 0.013 |
| 16 | 216 | 0.50 | x | — | 0.003 | — |
| 17 | 324 | 0.50 | x | 0.001 | 0.006 | — |
| 18 | 324 | 0.50 | x | — | 0.024 | — |
| 19 | 324 | 0.50 | x | — | 0.004 | — |
| 20 | 98 | 1.0 | 0.97 | — | 0.009 | 0.013 |
| 21 | 98 | 2.0 | 1.85 | — | 0.012 | 0.013 |
| 22 | 79 | 5.0 | 4.67 | — | 0.016 | 0.009 |

NOTE.—Feed gas composition in Test Nos. 9–22 was 0.08% hydrogen sulfide, 71% hydrogen, 25% carbon dioxide, and 3% carbon monoxide. Gas composition in Test Nos. 7 and 8 was 100% carbon dioxide.

Table II conclusively demonstrates the effectiveness of arsenious oxide as a corrosion inhibitor for hot potassium carbonate gas scrubbing processes. The contrast between corrosion rates in Table II as compared to Table I is clearly evident. Table II also clearly shows that the effectiveness of arsenious oxide exists most advantageously in the concentration range of from 0.1% to 0.5% by weight. Lower concentration, below 0.1% by weight, does not provide dependable protection, as indicated in Test No. 9. Surprisingly, the use of higher concentrations of $As_2O_3$ as in Test Nos. 20–22 resulted in no marked improvement in inhibiting corrosion by the hot potassium carbonate solution. Table II further shows that arsenious oxide is a stable inhibitor, with an overall average loss of only about 8% in 80 hours. In practice this would be considerably lower, when operating equilibrium is attained.

Table III.—*Antimony, Bismuth and Phosphorus Compounds as Inhibitors*

| Test No. | Test time, hrs. | Inhibitor in solution | | | Corrosion rate, i.p.y. | | |
|---|---|---|---|---|---|---|---|
| | | Type or formula | Conc., weight percent | | Mild St. Disc | Mild St. Tube | S.S. Tube |
| | | | Initial | Final | | | |
| 23 | 86 | $Sb_2O_3$ | 0.1 | x | — | 0.009 | — |
| 24 | 108 | $Sb_2O_3$ | Saturated (0.17 max.) | x | — | 0.007 | 0.001 |
| 25 | 86 | $Bi_2O_3$ | 0.1 | x | — | 0.024 | — |
| 26 | 108 | $Bi_2O_3$ | Saturated (0.17 max.) | x | — | 0.012 | 0.001 |
| 27 | 86 | $KH_2PO_2$ | 0.50 | x | — | 0.044 | — |

NOTE.—Feed gas composition was the same as in Table II (Test Nos. 9–22).

Table III provides clear evidence that trivalent metallic compounds of antimony and bismuth, as well as hypophosphites, are effective corrosion inhibitors for hot carbonate systems, in an inhibitor concentration range analogous to arsenious oxide (see Table II supra). Antimony oxide and bismuth oxide were only slightly soluble in the test solution under the test conditions, hence the inhibitor concentrations in Test Nos. 32 and 34 represent saturation of the solution with the respective inhibitor. Notwithstanding the slight solubility of the antimony oxide and bismuth oxide in solution, it is a part of the invention to add these oxides in amounts of 0.1–0.5%. The finely divided oxide can be carried around in the gas scrubbing and regeneration circuits as a suspension without clogging the tower packings. One advantage flowing from the use of a slight excess in suspension is that oxide is available to go into solution upon the loss of the solubilized inhibitor.

Table IV shows that small concentrations of arsenic and antimony oxide maintain effective corrosion control under the stringent conditions of the cyclic test. This is Table IV.—*Comparative Effectiveness of Inhibitors—Cyclic Test*

| Test No. | Test time, hrs. | Inhibitor in solution | | | Corrosion rate, i.p.y. | | |
|---|---|---|---|---|---|---|---|
| | | Type or formula | Conc., weight percent | | Mild St. Disc | Mild St. Tube | S.S. Tube |
| | | | Initial | Final | | | |
| 28 | 103 | None | — | — | 0.170 | 1.90 | 0.005 |
| 29 | 103 | $As_2O_3$ | 0.50 | 0.51 | 0.013 | 0.019 | 0.002 |
| 30 | 102 | Phenyl arsonic acid | 1.0 | x | 0.069 | 0.062 | 0.034 |
| 31 | 86 | $Sb_2O_3$ | 0.10 | x | — | 0.023 | — |
| 32 | 103 | Arsanilic acid | 0.5 | x | 0.025 | 2.20 | 0.010 |
| 33 | 66 | Phosphotungstic acid | 1.0 | x | 0.430 | 4.100 | 0.079 |
| 34 | 66 | Potassium aluminate/K silicate | 0.5/0.5 | x/x | 0.030 | 4.400 | 0.046 |

NOTE.—Feed gas composition for Test Nos. 28–34 was the same as in Table II (Test Nos. 9–22).

demonstrated in Test Nos. 29 and 31. The various other agents tested uniformly failed to provide satisfactory protection against corrosion. In most cases the corrosion rate was very high, while in some instances the agents were deficient due to decomposition, formation of precipitates and/or hydrolysis in solution.

What we claim is:

1. Method of inhibiting corrosion of ferrous metal surfaces by a strong aqueous potassium carbonate solution containing dissolved carbon dioxide together with a minor proportion of hydrogen sulfide, said solution having a carbonate concentration of at least 15%, which comprises incorporating in said solution from about 0.1% to 0.5% by weight of a compound selected from the group consisting of the trivalent metallic oxides of arsenic, antimony and bismuth.

2. In the process of separating weakly acidic gases including a minor proportion of hydrogen sulfide from a gas stream by contacting said gas stream with potassium carbonate absorbent solution of at least 15% carbonate concentration at elevated pressure, the improvement which comprises prevention of the corrosion of ferrous apparatus wherein said absorption takes place, by the inclusion in said solution of from about 0.1% to 0.5% by weight of a corrosion inhibiting compound selected from the group consisting of the trivalent metallic oxides of arsenic, antimony and bismuth.

3. In the process of separating carbon dioxide together with a minor proportion of hydrogen sulfide from a gas stream by contacting said gas stream with potassium carbonate absorbent solution of at least 15% carbonate concentration at elevated pressure followed by solution regeneration at lower pressure, the improvement which comprises prevention of the corrosion of ferrous apparatus wherein said absorption and regeneration takes place, by the inclusion in said solution of from about 0.1% to 0.5% by weight of a corrosion inhibiting compound selected from the group consisting of the trivalent metallic oxides of arsenic, antimony and bismuth.

References Cited in the file of this patent

UNITED STATES PATENTS

| | | |
|---|---|---|
| 1,719,180 | Jacobson | July 2, 1929 |
| 2,943,910 | Giammarco | July 5, 1960 |
| 2,993,750 | Giammarco | July 25, 1961 |